United States Patent
Saha et al.

(10) Patent No.: US 10,904,158 B2
(45) Date of Patent: Jan. 26, 2021

(54) CONTROLLING OF VIRTUALIZED NETWORK FUNCTIONS FOR USAGE IN COMMUNICATION NETWORK

(71) Applicant: NOKIA SOLUTIONS AND NETWORKS OY, Espoo (FI)

(72) Inventors: Sumanta Saha, Espoo (FI); Wolfgang Hahn, Bergfelde (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/728,059

(22) Filed: Jun. 2, 2015

(65) Prior Publication Data
US 2015/0358248 A1    Dec. 10, 2015

(30) Foreign Application Priority Data

Jun. 9, 2014    (EP) .................................. 14171639

(51) Int. Cl.
*G06F 15/173*    (2006.01)
*H04L 12/911*    (2013.01)
(Continued)

(52) U.S. Cl.
CPC .......... *H04L 47/70* (2013.01); *H04L 41/0893* (2013.01); *H04L 41/5096* (2013.01);
(Continued)

(58) Field of Classification Search
CPC ........................ H04L 41/0893; H04L 41/5096
(Continued)

(56) References Cited

U.S. PATENT DOCUMENTS

2002/0087611 A1 * 7/2002 Tanaka ................ G06F 11/3433
718/1
2009/0064158 A1 * 3/2009 Carter ................ G06F 11/3433
718/104
(Continued)

FOREIGN PATENT DOCUMENTS

CN          102857363 A      1/2013
EP          2 648 391 A1    10/2013
WO      WO 2014/062796 A1   4/2014

OTHER PUBLICATIONS

European Search Report dated Nov. 26, 2014 corresponding to European Patent Application No. 14171639.9.
(Continued)

*Primary Examiner* — Duyen M Doan
(74) *Attorney, Agent, or Firm* — Squire Patton Boggs (US) LLP

(57) ABSTRACT

A method including obtaining a plurality of data sets each describing a specific virtualized network function, acquiring and processing control information related to at least one of a communication traffic situation in a communication network for which at least one virtualized network function is implementable and a resource usage situation in a virtualization infrastructure in which at least one virtualized network function can be instantiated, and adjusting an amount and type of at least one virtualized network function instantiated in the virtualization infrastructure for usage in the communication network by, based on the processed control information, selecting at least one virtualized network function from the obtained data sets, instantiating the selected at least one virtualized network function.

13 Claims, 8 Drawing Sheets

(51) Int. Cl.
*H04L 12/801* (2013.01)
*H04L 12/24* (2006.01)
*H04L 12/26* (2006.01)

(52) U.S. Cl.
CPC .......... *H04L 43/0817* (2013.01); *H04L 47/12* (2013.01); *H04L 43/16* (2013.01)

(58) Field of Classification Search
USPC .................................................. 709/203, 226
See application file for complete search history.

(56) References Cited

U.S. PATENT DOCUMENTS

| | | | |
|---|---|---|---|
| 2011/0154320 A1* | 6/2011 | Verma ...................... | G06F 8/63 718/1 |
| 2011/0295998 A1* | 12/2011 | Ferris .................... | G06F 9/5072 709/224 |
| 2012/0167081 A1* | 6/2012 | Sedayao ................. | G06F 11/30 718/1 |
| 2013/0111467 A1* | 5/2013 | Sundararaj .............. | G06F 9/505 717/176 |
| 2013/0111468 A1* | 5/2013 | Davis .................... | G06F 9/5077 718/1 |
| 2013/0188480 A1 | 7/2013 | Hahn | |
| 2014/0007097 A1* | 1/2014 | Chin ................... | G06F 9/45533 718/1 |
| 2014/0058871 A1 | 2/2014 | Marr et al. | |
| 2014/0073335 A1 | 3/2014 | Panchal | |
| 2014/0189109 A1* | 7/2014 | Jang ........................ | H04L 67/10 709/224 |
| 2014/0280488 A1* | 9/2014 | Voit ...................... | G06F 9/5083 709/203 |

OTHER PUBLICATIONS

VMware: "Multiple gateway-va Virtual Machines"; VMware Horizon Workspace 1.5 Documentation Center; 1 page; https://pubs.vmware.com/horizon-workspace-15/index.jsp?topic=%2Fcom.vmware.hs-install.doc_15%2FGUID-A37EA024-743D-468C-BFFF-F103E7877E79.html.

MEVICO (Mobile Networks Evolution for Individual Communications Experience): "MEVICO Project Description."; 2 pages; http://www.mevico.org/Description.html.

James Kempf et al: "Software Defined Networking: Overview and use cases"; Sep. 5-8, 2012, Dagstuhl Seminar 12363; Ericsson; 20 pages; http://boemund.dagstuhl.de/mat/index.en.phtml?12363.

Kostas Pentikousis et al: "Mobileflow: Toward software-defined mobile networks"; IEEE Communications Magazine; IEEE Service Center, Piscataway, US; vol. 51, No. 7; Jul. 1, 2013 (Jul. 1, 2013); XP011519224; ISSN: 0163-6804; DOI:10.1109/MCOM.2013.6553677; the whole document.

Taleb Tarik: "Toward carrier cloud: Potential, challenges, and solutions"; IEEE Wireless Communications, IEEE Service Center, Piscataway, NJ, US; vol. 21, No. 3; Jun. 1, 2014 (Jun. 1, 2014); pp. 80-91; XP011552461; ISSN: 1536-1284; DOI: 10.1109/MWC.2014.6845052 [retrieved on Jun. 26, 2014] the whole document.

European Search Report application No. 14171639.9 dated Nov. 26, 2014.

European Office Action corresponding to Application No. 14 171 639.9, dated Jan. 29, 2018.

D. King et al, "Virtualisation of Mobile Core Network Use Case, draft-king-vnfpool-mobile-use-case-01.txt"; Jun. 8, 2014, XP015099466, pp. 1-14.

Draft ETSI GS NFV-SWA 001 v0.2.0 (May 2014); "Network Functions Virtualisation (NFV); Virtual Network Functions Architecture", Jun. 2, 2014, XP014184871, pp. 1-94.

Chinese Office Action corresponding to Patent Application No. 201510536475.7, dated Jan. 2, 2018.

Chinese Office Action corresponding to Appln. No. 201510536475.7, dated Sep. 29, 2018.

Chinese Office Action corresponding to Application No. 201510536475.7, dated Apr. 28, 2019.

* cited by examiner

CONTROLLING OF VIRTUALIZED NETWORK FUNCTIONS FOR USAGE IN COMMUNICATION NETWORK

BACKGROUND

Field

The present invention relates to apparatuses, methods, systems, computer programs, computer program products and computer-readable media usable for controlling at least one virtualized network function for usage in a communication network.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partner Project
AP: access point
APN: access point name
BGCF: breakout gateway control function
BS: base station
BSS: business support system
CAPEX: capital expenditure
CN: core network
CP: control plane
CPU: central processing unit
CSCF: call session control function
DB: database
DC: data centre
DL: downlink
eNB: evolved node B
EMS: element management system
EPC: evolved packet core
GPRS: general packet radio service
GW: gateway
HSS: home subscriber server
HW: hardware
IBCF: interconnection border control function
ID: identification, identifier
IMS: IP multimedia system
IP: Internet protocol
KPI: key performance indicator
LTE: Long Term Evolution
LTE-A: LTE Advanced
M2M: machine to machine
MGCF: media gateway control function
MME mobility management entity
MTC: machine type communication
NE: network element
NF: network function
NFV: network function virtualization
OF: open flow
OPEX: operational expenditure
OSS: operations support system
P-CSCF: proxy call session control function
PCRF: policy and charging rules function
PGW packet data network gateway
QoE: quality of experience
QoS: quality of service
RAN: radio access network
SAE: system architecture evolution
SDN software defined networks/networking
SGSN: serving GPRS support node
SGW: signaling gateway
SW: software
TCO: total costs of ownership
UE: user equipment
UL: uplink
UP: user plane
VIM: virtual infrastructure manager
VM: virtual machine
VNF: virtualized network function
VNF: VNF manager Embodiments of the present invention are related to a communication network including at least one virtualized network function. A virtualized network function may be of any type, such as a virtual core network function, a virtual access network function, a virtual IMS element, a function or element capable to an M2M communication, or the like.

SUMMARY

According to an example of an embodiment, there is provided, for example, a method including obtaining a plurality of data sets each describing a specific virtualized network function, acquiring and processing control information related to at least one of a communication traffic situation in a communication network for which at least one virtualized network function is implementable and a resource usage situation in a virtualization infrastructure in which at least one virtualized network function can be instantiated, and adjusting an amount and type of at least one virtualized network function instantiated in the virtualization infrastructure for usage in the communication network by, based on the processed control information, selecting at least one virtualized network function from the obtained data sets, and instantiating the selected at least one virtualized network function.

Furthermore, according to an example of an embodiment, there is provided, for example, an apparatus including at least one processing circuitry, and at least one memory for storing instructions to be executed by the processing circuitry, wherein the at least one memory and the instructions are configured to, with the at least one processing circuitry, cause the apparatus at least: to obtain a plurality of data sets each describing a specific virtualized network function, acquire and process control information related to at least one of a communication traffic situation in a communication network for which at least one virtualized network function is implementable and a resource usage situation in a virtualization infrastructure in which at least one virtualized network function can be instantiated, and adjust an amount and type of at least one virtualized network function instantiated in the virtualization infrastructure for usage in the communication network by, based on the processed control information, selecting at least one virtualized network function from the obtained data sets, and instantiating the selected at least one virtualized network function.

According to further refinements, these examples may include one or more of the following features:
  each of the plurality of data sets may include a software image corresponding to the specific virtualized network function;
  the data sets each may include information about at least one of capabilities of the specific virtualized network function for a usage in the communication network, and an amount and type of resources to be allocated in the virtualization infrastructure;

the amount and type of resources to be allocated in the virtualization infrastructure may be separable with regard to resources to be allocated in the virtualization infrastructure for a usage in a control plane of a virtualized network function in the communication network and for a usage in a user plane of the same virtualized network function in the communication network;

the plurality of data sets may be obtained in at least one of a software build phase for implementing an orchestrator element or function for virtualized network functions, an operation phase of the orchestrator element or function for virtualized network functions, and at any time before the orchestrator element or function for virtualized network functions executes an instantiation process for instantiating a virtualized network function;

the control information may include at least one of information about a traffic pattern or traffic mix of communications conducted in the communication network, an indication that a load level in the communication network exceeds a threshold, and information about at least one of processing resources, storing resources, and data transmission resources of the virtualization infrastructure available for an instantiation of at least one virtualized network function;

the processing of the control information may include comparing of parameters derived from the control information with parameters derived from the plurality of data sets, and determining a data set of the plurality of data sets whose parameters matches with the parameters derived from the control information;

the selecting of the at least one virtualized network function may consider variations in the plurality of data sets and an operator specific setup;

a control loop may be implemented based on the processed control information for adjusting the amount and type of at least one virtualized network function instantiated in the virtualization infrastructure for usage in the communication network, and/or, based on a monitored history of the communication traffic situation in the communication network, a requirement for a specific virtualized network function may be predicted, wherein the adjustment of the amount and type of at least one virtualized network function instantiated in the virtualization infrastructure for usage in the communication network may be based on the prediction;

a plurality of different virtualized network functions may be instantiated in parallel based on the data sets, wherein user communications may be assigned to a respective one of the different virtualized network functions according to at least one of a subscription type of the user communication, a service type for the user communication, and an access point type of the user communication.

an activity level for adjusting the amount and type of at least one virtualized network function instantiated in the virtualization infrastructure for usage in the communication network may be set according to a resource usage state in the virtualization infrastructure, wherein the activity level may be one of an activity level where the adjustment of the amount and type of at least one virtualized network function is conducted only in a case of scaling out for adding a new virtualized network function, and an activity level where the adjustment of the amount and type of at least one virtualized network function is conducted for removing a virtualized network function by replacing it with a new virtualized network function;

the processing may be executed by one of a communication network control element or communication network control function acting as a orchestrator for instantiating virtualized network functions, and a communication network control element or communication network control function of acting as a manager for the virtualized network function wherein the at least one virtualized network function being instantiated is related to a communication network control function of the communication network.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
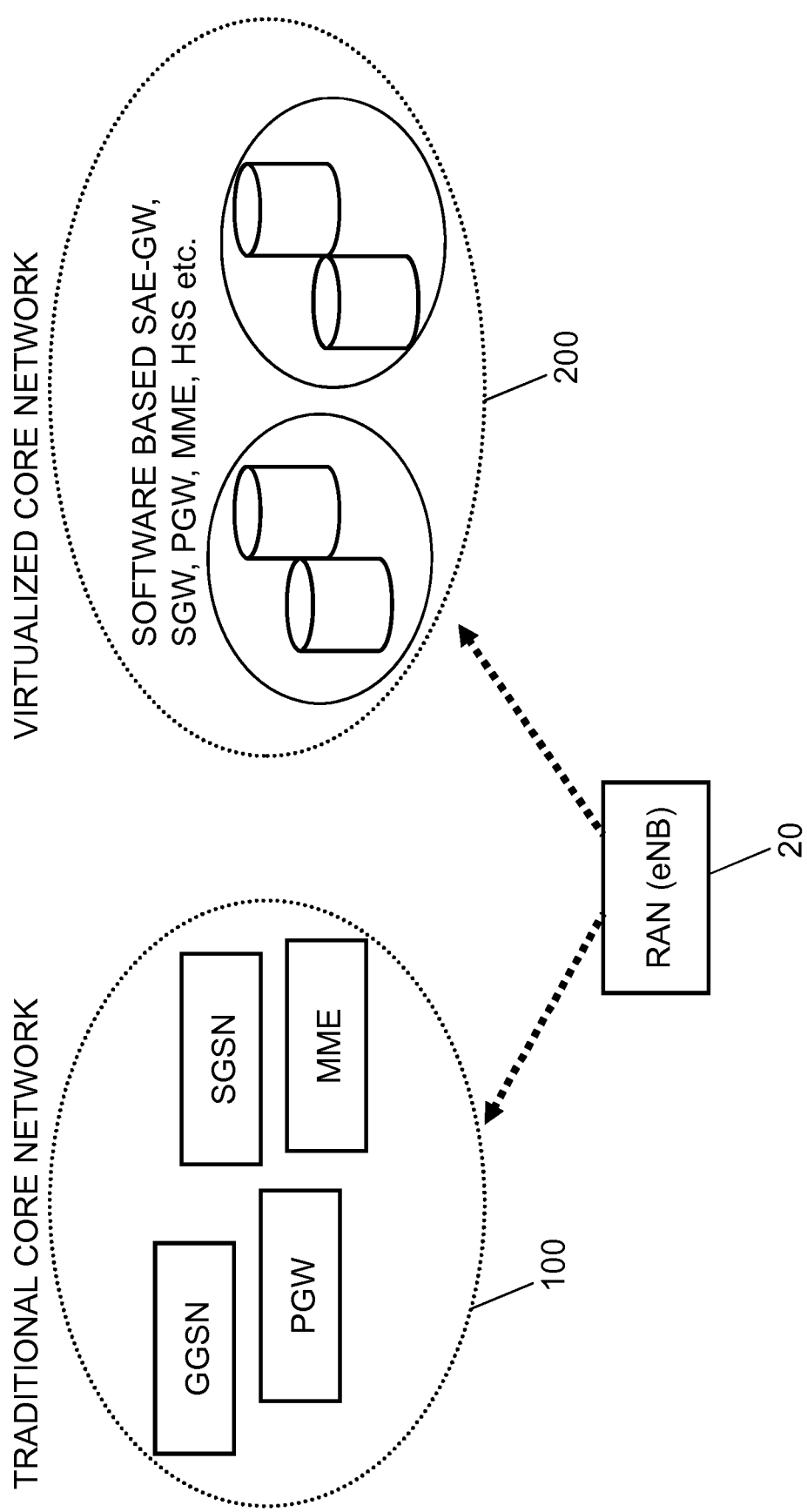
FIG. 1 shows a diagram illustrating a general configuration of communication networks where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), and fourth generation (4G) communication networks or enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user device or user equipment (UE) and another communication network element or user device, a database, a server, host etc., one or more network elements such as communication network control elements, for example access network elements like access points, base stations, eNBs etc. and core network elements or functions, for example control nodes, support nodes, service nodes, gateways etc. are involved, which may belong to different communication network systems.

Such communication networks include, for example, a large variety of proprietary hardware appliances. Launching a new network service often requires yet another appliance and finding the space and power to accommodate these boxes is becoming increasingly difficult. Moreover, hardware-based appliances rapidly reach end of life. Due to this, it has been considered to use, instead of hardware based network elements, virtually generated network functions, which is also referred to as network functions virtualization (NFV). By means of software based virtualization technology, it is possible to consolidate many network equipment types onto industry standard high volume servers, switches and storage, which could be located in data centres, network nodes and in the end user premises, for example.

In NFV, network node functions are virtualized into building blocks that may be connected, or chained, together to create communication services. A virtualized network function (VNF) may consist of one or more virtual machines (VM) running different software and processes, e.g. on top of standard high volume servers, switches and storage, or even cloud computing infrastructure, instead of having custom hardware appliances for each network function. A service provider who follows the NFV design can implement one or more virtualized network functions. Another aspect of implementing NFV is the orchestration process. In order to build highly reliable and scalable services, NFV requires that the network be able, for example, to instantiate VNF instances, monitor them, repair them, and bill for the services rendered. This task is allocated to an orchestration layer, referred to also as orchestrator.

With regard to communication networks, NFV is also useful in view of the fact that data traffic growth is permanently increasing and predicted for mobile networks. Operators are forced to provide increased traffic volumes by flat or moderate price increase only. This leads to efforts to reduce TCO, OPEX and CAPEX. Here, NFV and using a suitable virtualization infrastructure, such as common data centre (DC) hardware for different network functions, allows to keep control about the above mentioned costs.

For example, corresponding implementations, which are also termed as "cloud computing and virtualization", are characterized generally by a centralization of network management and control functions in DC, the possibility to allow network elasticity and flexibility to cope with changing traffic demands by more dynamically assigning of resources and "programming" of the network functionality needed, and a higher HW utilization in virtualization infrastructures such as cloud computing environments sharing the same HW by different functions. Examples for deployments for network functions are centralized network functions like BSS/OSS or control functions like IMS. In this connection, specific considerations are to be made for user plane processing, since it is demanding in terms of bandwidth that need to path the DC, and latency requirements which directly impact the user experience (QoS/QoE).

In order to handle the increased cost pressure for operators caused by the increasing data traffic, it would be beneficial to reduce the number of nodes that need special HW implementation, also in the user plane. This allows for OPEX saving due to more easy management of the life cycle and introduction of new features, and allows for CAPEX savings by using standard HW and participating on HW innovation cycles etc.

FIG. 1 shows an example of a general configuration of communication networks where some examples of embodiments are implementable. As shown in FIG. 1, network functions may be implemented as "traditional" network elements, i.e. as dedicated hardware entities forming e.g. a traditional core network 100 of a communication network system consisting of e.g. GGSN, SGSN, PGW, MME, SGW etc. (i.e. core network elements like EPC elements, but also IMS network elements, etc.). Alternatively or additionally to the traditional core network, corresponding network functions may also be implemented in the form of virtual/virtualized network functions (corresponding to network elements or specific functions thereof), i.e. as software running on corresponding computing devices like servers or the like and forming a virtualized core network 200. Such a virtualized core network includes, for example, software based PGW, MME, HSS, SGW, etc., which execute the same or at least similar functions like corresponding hardware based network elements. An access network subsystem 20, such as a RAN (including one or more BS or eNBs) or a fixed access network, may be controlled by and have access to the core networks 100 and 200, as shown in FIG. 1.

Furthermore, it is to be noted that in a communication system both approaches may be used simultaneously and in a mixed manner. For example, a core network being employed for services includes virtual and "real" network elements or functions interacting which each other. Furthermore, also other network functions besides those of a core network (like e.g. EPC or IMS), such as network functions of an access network element like an eNB or BS may be provided as virtualized network functions.

NFV involves the implementation of network functions in software that can run on server hardware, and that can be moved to, or instantiated/setup in, various locations in a network or cloud/datacenters as required, without the need for installation of new equipment.

It is to be noted that it is, for example, possible to dynamically placing elements/functions of a core network in a flexible manner (e.g. without or with decomposed SGW and/or PGW being split into UP and CP) into the virtualization infrastructure (e.g. the cloud). Dynamically placing the NF into the virtualization infrastructure allows also that all or a part of the VNFs or some parts or functions of the related network (e.g. the core network) is/are dynamically withdrawn completely from the virtualization infrastructure (i.e. de-instantiated), while other parts (legacy or SDN based or virtualized network functions) remain in the network structure and virtualization infrastructure as deemed necessary.

In this context, it is to be noted that the term "instantiated" (or instantiation) means in the context of the following description, for example, that a virtual network function acting in a communication network in the virtualized network part (see e.g. FIG. 1), i.e. in the virtualization infrastructure, is set up, turned on, activated or made in some other manner available for other communication network elements or functions. On the other hand, the term "de-instantiated" (or de-instantiation) may be understood, for example, that a virtual network function acting in a communication network in the virtualized network part (see e.g. FIG. 1) is turned off, deactivated or made in some other manner not available for other communication network elements or functions, i.e. the instantiation of the virtual network function in question is removed or cancelled, at least temporarily.

However, handling of user traffic in the virtualization infrastructure (such as for example a DC) requires the implementation of an efficient usage of the available resources in the DC.

One possible approach is to redesign network elements, for example a gateway, into a centralized control part and a distributed GW that is based on SDN/OF switches and a mobility tunnel termination. This allows for separating the UP processing on dedicated HW while keeping the control plane in DC.

One advantage of such a configuration is that CP and UP of a GW can run in different hardware or VMs and this way scale independently. This is especially useful in case the traffic pattern of terminal devices is difficult to predict and changes over time or locations. For example, there may be devices (such as for example terminal devices like sensors or other machine type devices) requiring little UP traffic capacity but generating a high amount of signalling/CP traffic (e.g. by attaching and detaching from the network etc). On the other hand, other devices (such as for example smart phones or tablets) may be always on and not generating a high amount of signalling/CP traffic but generating a high amount of data/UP traffic. Therefore, an independent scaling is useful.

However, there are also some drawbacks to be considered in such a configuration. For example, it is not defined how specific GW UP functions like charging and policy control are running in case the UP GW is designed as a simple SDN switch to achieve cost advantages. Furthermore, combining GW-UP functions and SDN switches and controlling via an SDN controller links mobile specific functions tightly to transport network functions what makes the management of the network complicated. Furthermore, the GW split into GW-control plane and GW-user plane (switch) requires a complete redesign of known elements, such as current 3GPP based SGW and PGW. This would represent a high barrier for introducing the concept in current products. Moreover, a new/additional interface needed between CP and UP introduces a new overhead, e.g. requires also new functions for interface protocol handling that make the overall solution less efficient.

There are various reasons for these issues. For example, for scaling in the virtualization infrastructure, such as e.g. a DC, the number of VMs used to run a specific network functions may be increased (or in other words scaled out) or decreased (or in other words scaled in). With collocated CP and UP software in a single standard VM image it is however difficult to serve different variations of subscribers (high CP activity such as sensors, and high UP activity such as smart phones) in an optimal way.

Furthermore, the usage of special hardware accelerators and capabilities becomes also difficult with the use of a standard VM type for all GW instances. For example, the availability of such hardware capabilities is not known in a compile time, and thus cannot be taken for granted as default. Consequently, with a one-for-all virtual image of a network function, the UP of the gateway is not able to take the advantage of hardware acceleration, even if it is available.

Furthermore, the virtualization infrastructure, such as a DC, may also provide mechanisms to scale up and down resources during runtime for a VNF. For this, the SW stacks provide an abstracted view of resources (like computing or memory) to allow SW portability and simplify programming. How the requests by the VNF are implemented during runtime depends, for example, on the algorithms of a possible infrastructure manager and orchestrator, the current load situation and others. Thus, it cannot be predicted during SW design if requirements e.g. for high efficient communication between VNF components can be fulfilled by those scaling methods.

Hence, it is desirable to find an efficient way to implement network functions (for example core network functions like GW, MME etc., other functions like IMS related functions, etc.) in a manner that allows a dynamic control of different communication levels and profiles, such as a combination of handling of CP and UP of a network function, in one VM and allows at the same time a flexible reaction and scaling in case of changing traffic mixes.

In other words, according to examples of embodiments of the invention, measures and configurations are provided which allow for a dynamic orchestration and adaptation of virtualized network functions (for example gateways) in a virtualization infrastructure (such as for example a DC, the cloud etc.) according to a traffic mix in a communication network. For example, measures and configurations are provided which allow for a co-existence of CP and UP of a GW (e.g. a SAE-GW) in one VM while at the same time advantages provided by a separation of CP and UP into different VMs can be achieved. According to some examples of embodiments, for this purpose, multiple data sets (including e.g. SW images, SW instance flavors, descriptors etc.) are provided to address different traffic mix possibilities.

In the following, examples and examples of embodiments of the invention are related to a case where a virtualized network function, such as a virtualized core network function (such as for example MME, SGW, PGW, HSS etc.) or a virtualized access network function (such as for example an eNB), a virtualized IMS function (such as for example a P-CSCF, IBCF, BGCF, MGCF etc.) is instantiated. For example, examples of embodiments of the invention are related to a scenario where an UE attaches or registers to an eNB which in turn connects to a virtualized GW or the like.

It is to be noted that in the following the term "attach" or "register" is to be understood as representing different forms of connecting or establishing and maintaining a connection between elements, functions or applications communicate with each other, such as e.g. a connection between a communication element like a UE and a network (i.e. one or more network elements or functions), an M2M (machine to machine) communication, a communication involving one or more applications (such as for example video data providing applications or services, communication related application or services like Skype, etc.) and the like, such as "attach" in the sense of LTE systems, "register" in the sense of IMS systems, etc.

In the following, some examples of embodiments are described with reference to the drawings, wherein, as an example of a communication network, a cellular wireless communication network, such as an LTE or LTE-Advanced based system, is used. However, it is to be noted that the present invention is not limited to an application using such types of communication systems, but is also applicable in other types of communication systems, be it wireless systems, wired systems or systems using a combination thereof.

The following examples and embodiments are to be understood only as illustrative examples. Although the specification may refer to "an", "one", or "some" example(s) or embodiment(s) in several locations, this does not necessarily mean that each such reference is to the same example(s) or embodiment(s), or that the feature only applies to a single example version or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of an element, function or application capable of conducting a communication, such as a UE, an element or function usable in a M2M communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application capable of conducting a communication, like an UE, a network function etc., and a communication network besides those described in detail herein below.

The communication network is also able to communicate with other networks, such as a public switched telephone network or the Internet. The communication network may also be able to support the usage of cloud services. It should be appreciated that network elements of the access system, such as BSs and/or eNBs, of a core network, an IMS network etc., and/or respective functionalities may be implemented by using any node, host, server or access node etc. entity suitable for such a usage. As indicated above, network elements, such as access network elements or core network elements, or elements, functions or applications capable of conducting a communication may also be implemented by using a corresponding virtualized communication function or application.

Furthermore, the described network elements, such as terminal devices, communication network control elements of a cell, like a BS or an eNB, access network elements like APs and the like, core network elements etc. as well as corresponding functions as described herein, and other elements, functions or application capable of conducting a communication may be implemented by software, e.g. by a computer program product for a computer, and/or by hardware. For executing their respective functions, correspondingly used devices, nodes or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network element, network function, or of another entity of the communication network, such as of one or more of RAN elements like a BS or eNB, may be performed in different entities or functions, such as in a node, host or server, in a flexible manner. In other words, a "division of labour" between involved network elements, functions or entities may vary case by case.

Figure 2:
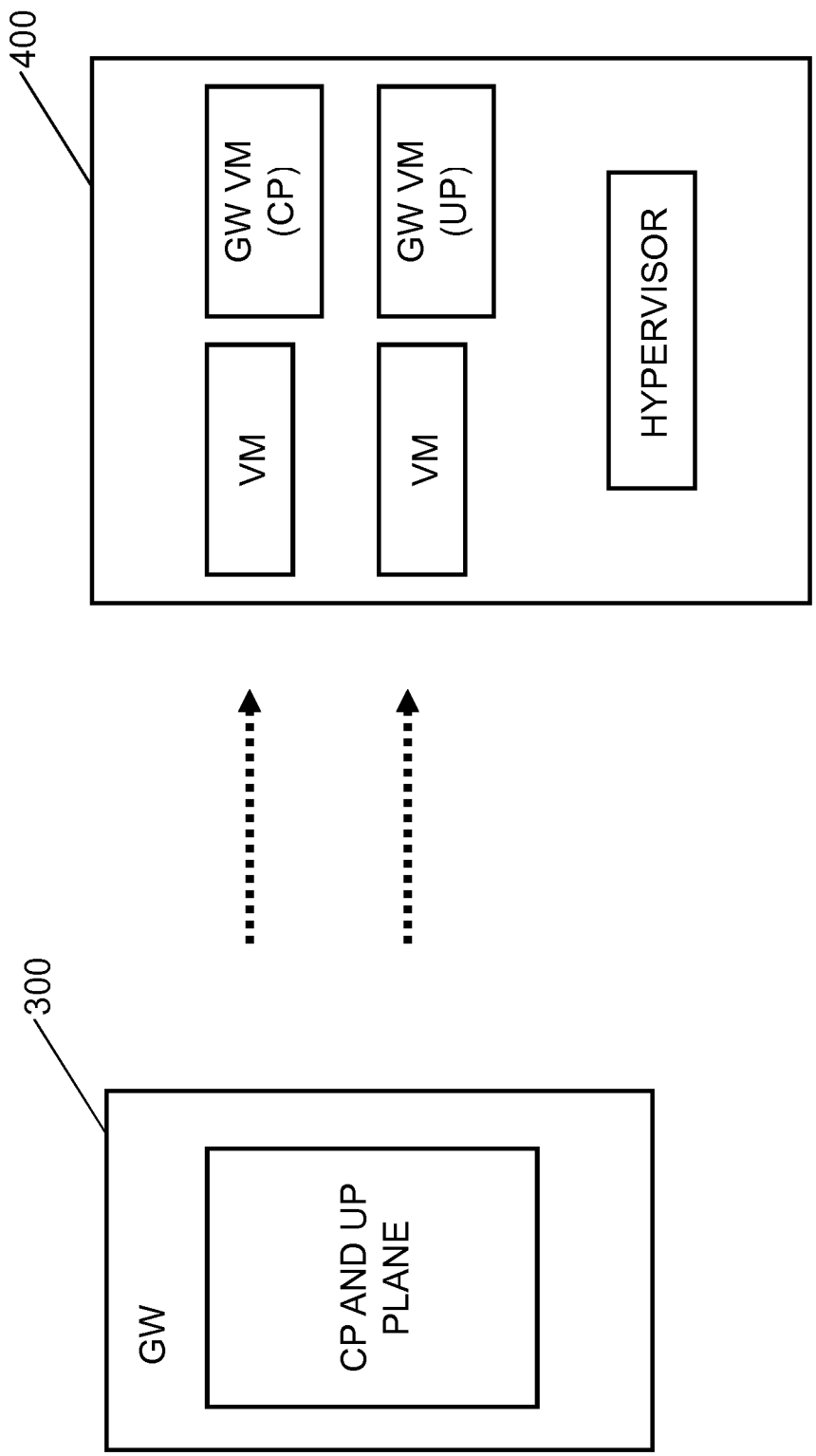
FIG. 2 shows a diagram illustrating an example of an implementation of a virtualized network function.

FIG. 2 shows a diagram illustrating an example of an implementation of a virtualized network function. Specifically, FIG. 2 illustrates a decomposition of a monolithic GW node (e.g. a SGW or the like) 300 into a virtualized network function 400 acting as a de-composed GW in the virtual environment, i.e. in a virtualization infrastructure such as a DC or cloud environment. Specifically, in the monolithic GW node 300, UP and CP are located in a composed manner. NFV generates in the virtualization infrastructure (DC, cloud) a corresponding VNF 400 which is configured to act as a GW similar to the GW node 300. The VNF 400 consists of several VMs and a hypervisor as a virtual machine managing function. At least one VM is used as a GW VM for CP and at least one other VM is used as a GW VM for UP.

As described above, by means of NFV, it is possible to realize cost reduction by implementing network functions such as a GW in a virtualization infrastructure such as a DC. At the same time, by de-composing the monolithic GW node into CP and UP it is possible to scale the respective parts independently in different VMs.

Figure 3:
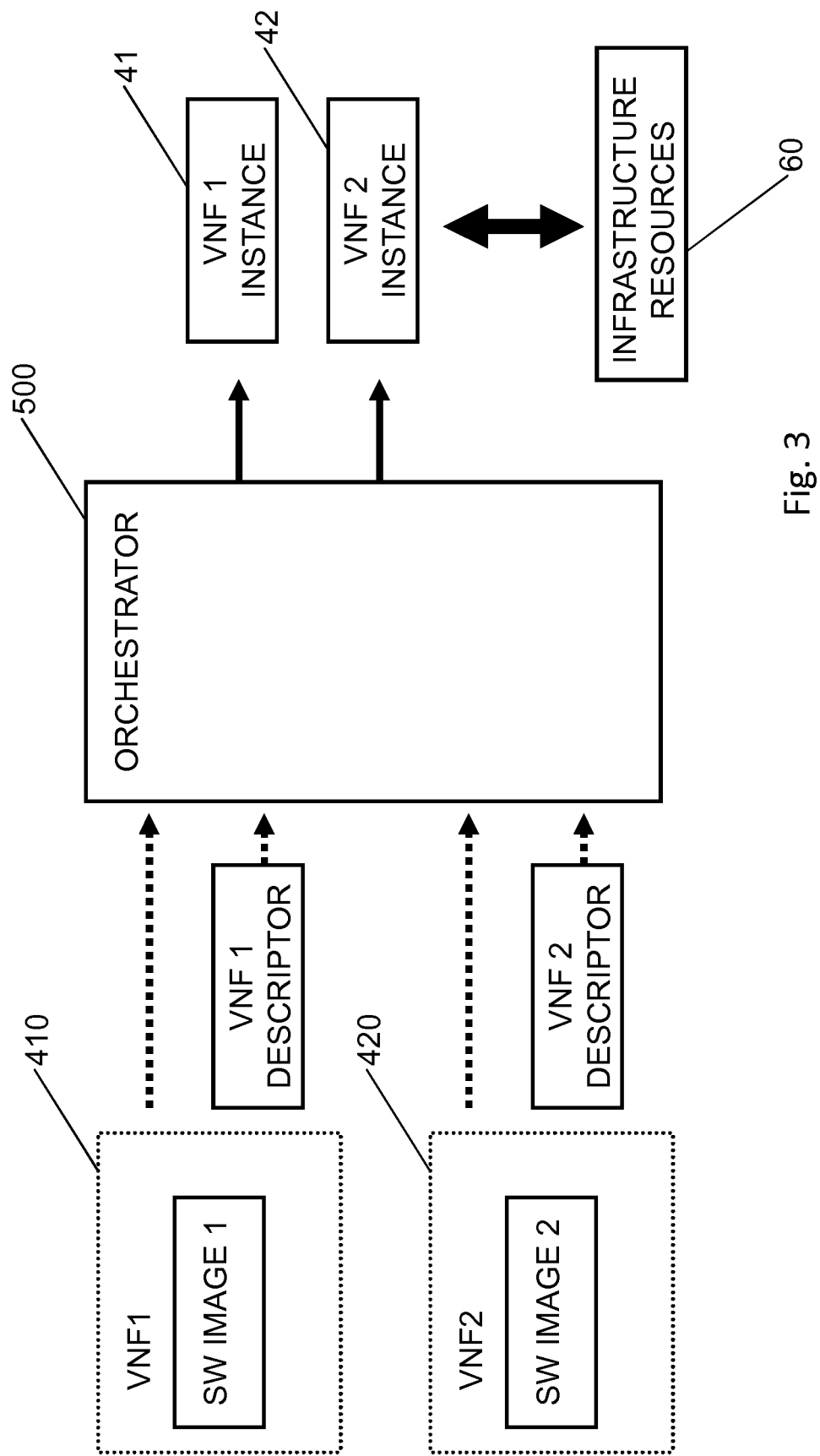
FIG. 3 shows a diagram illustrating instantiation examples of virtualized network functions.

FIG. 3 shows a diagram illustrating instantiation examples of virtualized network functions. For illustrative purposes, it is assumed that the VNFs considered in connection with FIG. 3 are GWs comparable to that described in connection with FIG. 2. However, as will be also discussed below, the VNFs are not limited to one specific type and may be related to other functions, such as MME etc.

As shown in FIG. 3, for instantiating a VNF, a network control element or function is provided which is referred to, for example, as an orchestrator 500. The orchestrator 500 is used to (directly or indirectly via a suitable managing entity to be described later) manage the virtualization of network functions, i.e. to instantiate (or de-instantiate) the respective VNFs in the virtualization infrastructure (DC, cloud environment) and to generate and manage the links to other network elements and functions of the communication network. According to examples of embodiments, some sort of interface from the orchestrator 500 to the cloud/DC is provided which may be designed to dynamically host software related to the virtualized network function, such as a GW software etc., which can be instantiated or withdrawn, or the like.

It is to be noted that the orchestrator 500 may be able to instantiate any virtualized network function etc. Furthermore, also links between the respective network elements or function (wherever they may be located, i.e. in a physical entity or in a cloud/datacenter) might be implicitly/explicitly or indirectly/directly be triggered by the orchestrator 500 to be instantiated. Furthermore, it is to be noted that according to examples of embodiments the type of network function or application etc. which may be instantiated by the orchestrator 500 (via a manager or directly) is not limited to a specific type only. For example, any core network element, such as an SGW or PGW (e.g. decomposed SGW and PGW), IMS network function, access network function (e.g. an eNB function) etc. may be instantiated.

The type of the network function, communication function or application to be instantiated by the orchestrator 500 may be selected and instructed by an operator according to a current need or the like.

For this purpose, a corresponding VNF type or functionality (e.g. VNF1 410 or VNF2 420) is input in the form of a corresponding SW image (SW image 1 and SW image 2, respectively) together with a corresponding VNF description (VNF descriptor 1 and VNF descriptor 2, respectively) into the orchestrator 500. For example, the VNF1 410 is input in case a GW (like a PGW) is required having a large session state memory (e.g. in case a GW is assumed to host a high number of sessions/users so that a comparative high amount of memory is to be assigned for a session state data base). On the other hand, the VNF2 420 is input in case a GW (like a PGW) is required needing only a small session state memory (e.g. in case a GW is assumed to host a small number of sessions/users so that a comparative low amount of memory is to be assigned for a session state data base). In the corresponding VNF descriptors, different run time resources/requirements are required like the described memory requirements.

When the corresponding VNF type (SW image) and descriptor is received in the orchestrator 500, an adaption of resources used from a virtualization infrastructure (e.g. the DC) 60 is executed by the instantiation process of VNF1 instance 41 and VNF2 instance 42, respectively. That is, resources of the virtualization infrastructure are allocated according to a template description or the like at the VNF instantiation time. That is, for the same functionality (defined by the "SW image"), e.g. a PGW function, different amount of resources are allocated during the instantiation.

However, by means of this procedure as described in connection with the example of FIG. 3, changes of e.g. the implementation or processing power of the VNF are not possible, especially if it relates to internal components of the VNF like the CP and UP part.

According to examples of embodiments described in the following, a process and configuration is provided which enables an efficient use of available hardware capability by a VNF to be instantiated (such as for example a GW). At the same time, it allows flexible resource split for different communication functions, such as CP and UP, based on the traffic model. According to some examples of embodiments, the possibility provided by a virtualization infrastructure, such as a cloud environment, is utilized that an operator can select automatically a separate SW image for the same virtualized functionality depending on the utilization of computing and hardware resources.

Therefore, according to examples of embodiments, data sets for different types of SW images for a VNF, which support different hardware profiles, are generated and provided to the orchestrator so that the orchestrator being responsible for the VNF instantiation can obtain these data sets. In the following, data sets are assumed which includes SW images and VNF descriptors. The provision of the data sets (so that they are obtained by the orchestrator) can be done basically at any time, for example in a software build phase of the orchestrator, in connection with an update of data in the orchestrator (e.g. a content update or version update of the software), during operation and managing of the VNFs by using a suitable signaling procedure, e.g. from an operator managing function, etc. These data sets can then be used for selecting a specific type of flavor of a network function during the instantiation time wherein the hardware resources in the virtualization infrastructure and/or the traffic profile in the communication network are used as control information (to be described later) in a corresponding selection process.

Figure 4:
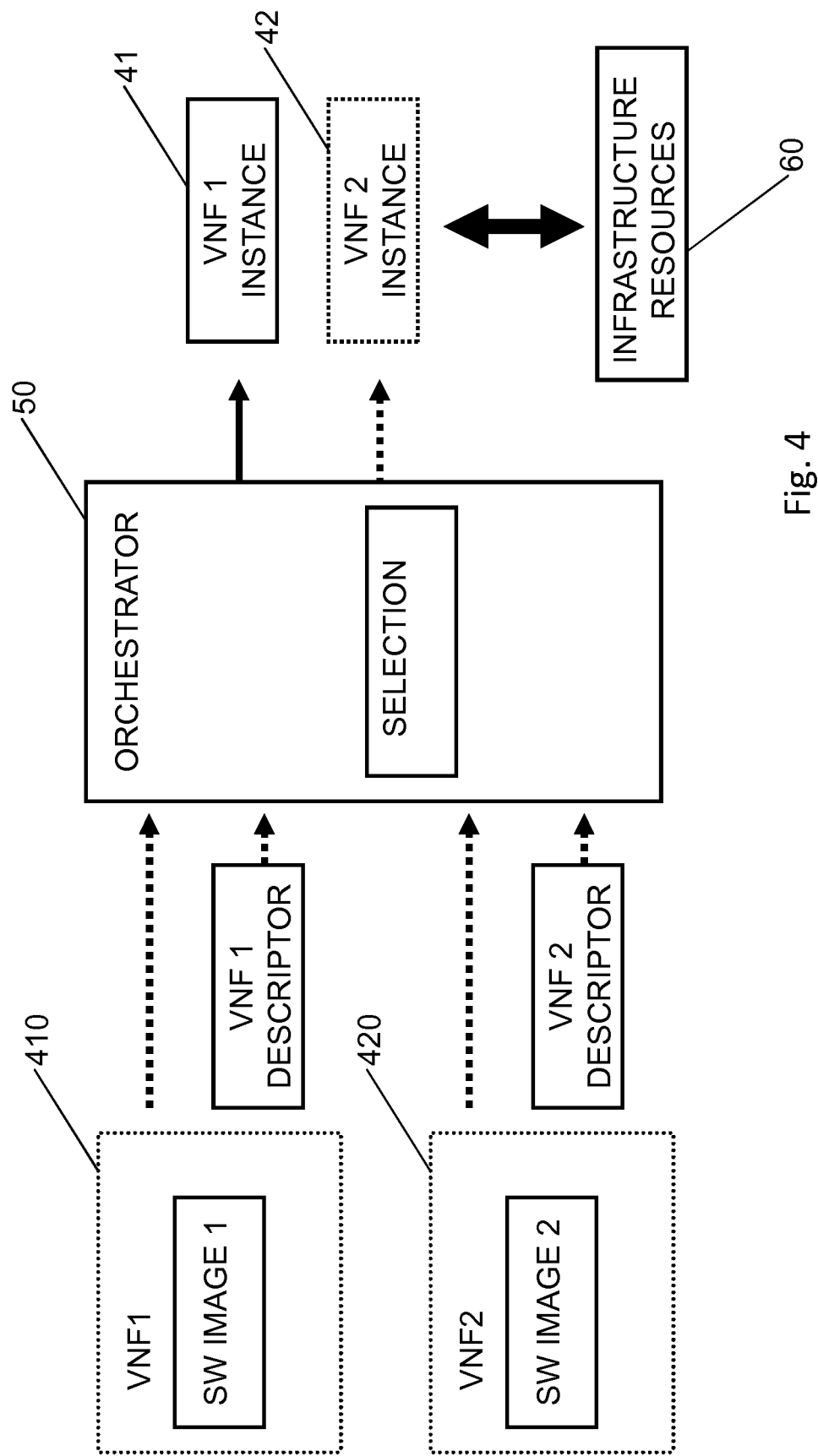
FIG. 4 shows a diagram illustrating instantiation examples of virtualized network functions according to examples of embodiments.

FIG. 4 shows a diagram illustrating instantiation examples of virtualized network functions according to examples of embodiments. Similar to the example described in connection with FIG. 3, a mobile network GW function (such as for example a SGW, PGW) is used for explaining the principles, but corresponding measures can be applied also to other network functions.

As shown in FIG. 4, for instantiating a VNF, a network control element or function is provided which is referred to, for example, as an orchestrator 50. Similar to the orchestrator 500 of FIG. 3, the orchestrator 50 is used to (directly or indirectly via a suitable managing entity to be described later) manage the virtualization of network functions, i.e. to instantiate (or de-instantiate) the respective VNFs in the virtualization infrastructure (DC, cloud environment) and to generate and manage the links to other network elements and functions of the communication network. In addition, the orchestrator 50 includes a selection function which is used to select a suitable type of VNF based on data sets and control data, as described in the following.

According to examples of embodiments, first a plurality of data sets 410, 420 is generated and made available to the orchestrator 50. Each data set 410, 420 defines one of different types of VNFs (e.g. for a respective type of GW). For example, a respective descriptor is included which provides a description of the respective VNF capabilities in templates and catalogs. The data sets are made available to the orchestrator by a suitable on-boarding process (i.e. the orchestrator 50 obtains the data sets). For example, the data sets are made available in the software build phase of the orchestrator 50 or later in time during operation, e.g. in connection with a data update.

The corresponding VNF type or functionality (e.g. VNF1 410 or VNF2 420) is specified for a specific network function type or flavor and may, for example, have allocated a different amount of resources to CP processing and UP processing. For example, the VNF1 410 describes a GW (like a PGW) having a high number of processing core allocation for CP. On the other hand, the VNF2 420 describes a GW (like a PGW) having a lower number of processing core allocation for CP. In the corresponding VNF descriptors, the same run time resources/requirements can be required.

In table 1, an example is indicated for an allocation of processing resources for VNF1 and VNF2. Specifically, an example is provided which describes a multi-core processor with 16 cores and two VNF types (implemented by different SW images).

TABLE 1

Different multi-processor core allocation for a GW CP and UP

| VNF | #cores for CP | #cores for UP | #cores for management | ratio CP/UP |
|-----|---------------|---------------|------------------------|-------------|
| VNF1 | 1 | 14 | 1 | 1/14 |
| VNF2 | 3 | 12 | 1 | 1/4 |

As can be seen in table 1, VNF1 requires a larger number of resources being allocated to UP than VNF2.

It is to be noted that the parameters used in a data set are not limited to those indicated in table 1. The parameters in the data sets may include additional or different parameters than the amount of internal processor cores. For example, also parameters related to an internal memory, an I/O capacity and/or other resources and information (such as for example a ratio) can be used. Furthermore, it is to be noted that parameters are not explicitly indicated in a data set when it is possible to derive necessary information from other sources, e.g. implicitly from a specific SW image.

In addition to runtime resources needed by the VNFs, the VNF descriptor contains parameters that link the type or flavor of the VNF (e.g. VNF1 and VNF2 in FIG. 3 and FIG. 4) to conditions in the virtualization infrastructure (e.g. a cloud environment or a DC) and network that are monitored during the runtime of the network. According to examples of embodiments, for a first instantiation of a VNF with different types, a predetermined default VNF type can be selected. Based on this information, the orchestrator 50 is able to select a suitable VNF type and start an instantiation. According to the present examples of embodiments, the assignment of parts of different resources to components of a VNF to be instantiated and their relation is done at a compilation time of the SW of the VNF type, wherein an instantiation of the VNF is done after a corresponding selection assigning the overall resources for the complete VNF. In other words, overall infrastructure requirements (processor, computing resources) for a VFN are described in the VNF descriptor and instantiated by the orchestrator. Internal resource consumption parts or the relation of the internal components of a VNF, such as CP and UP components, are defined by the SW image at a compilation time of the VNF type.

That is, when the data sets are obtained by the orchestrator 50, a monitoring and controlling procedure is executed in order to adjust the amount and type of VNFs to be instantiated in the virtualization infrastructure according to the requirements of the communication network. For this purpose, according to examples of embodiments, control information are acquired and processed which represent, for example, the needs in the communication network and the capability of the virtualization infrastructure. A corresponding control process is explained in the following with regard to FIG. 5.

Figure 5:
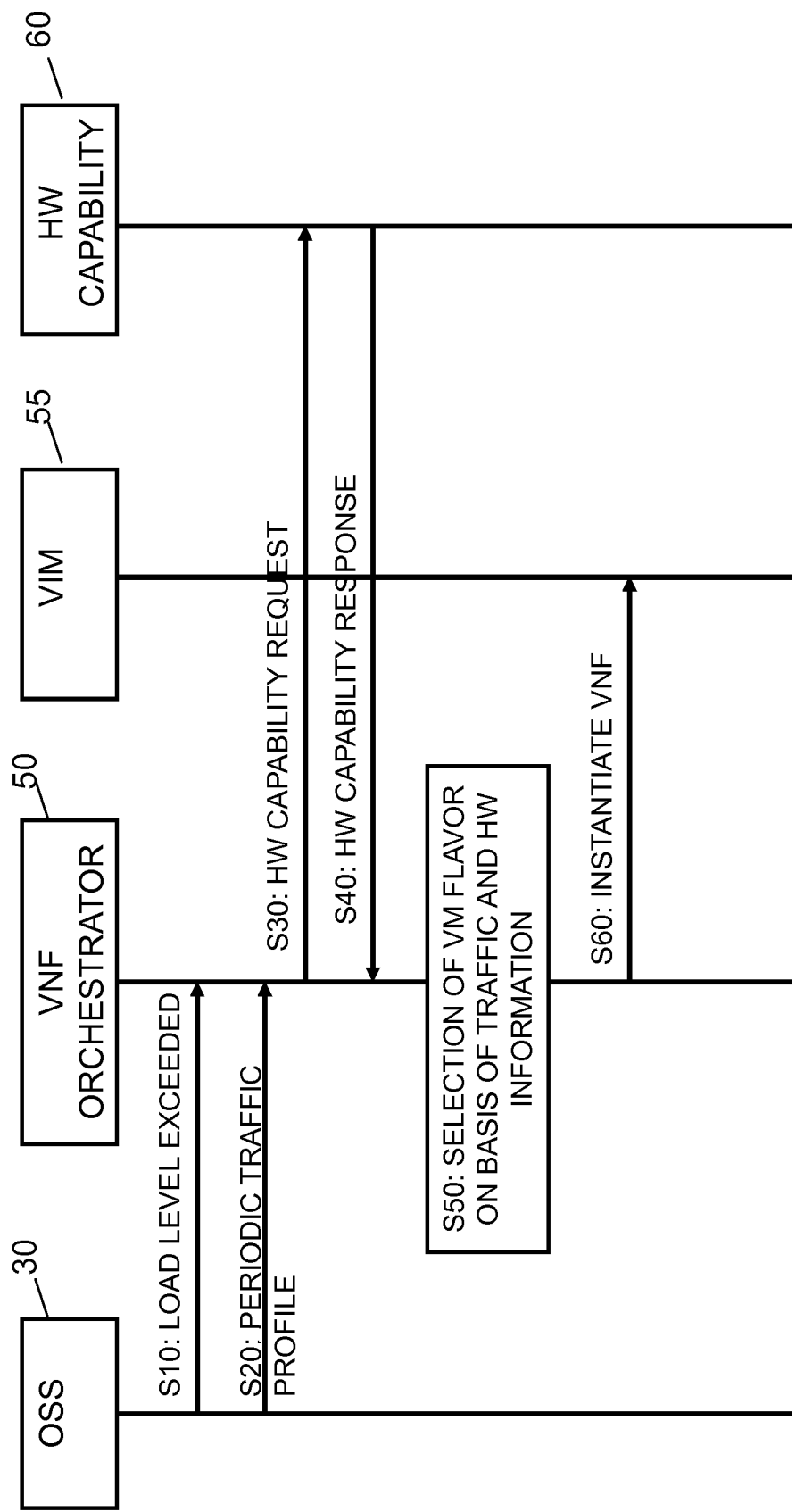
FIG. 5 shows a signaling diagram illustrating a control procedure according to some examples of embodiments.

FIG. 5 shows a signaling diagram illustrating a control procedure according to some examples of embodiments. As can be seen in FIG. 5, according to examples of embodiments, entities involved in control procedure for adjusting the amount and type of VNFs to be instantiated include an OSS 30, the VNF orchestrator 50, a VNF infrastructure manager 55 and the virtualization infrastructure (e.g. of the DC) 60 providing a HW capability.

The OSS 30 represents an example for a management system used for managing a communication network such as a cellular communication network and which supports management functions such as service provisioning, network configuration, fault management and traffic monitoring. The VNF infrastructure manager 55 represents an example for a managing element or function which manages resources of the virtualization infrastructure, such as the DC or the cloud environment, so as to monitor the resource usage and to allocate resources for the VNF instantiation.

In the processing described in FIG. 5, it is assumed that the VNF orchestrator 50 has already obtained data sets indicating the various VNFs, as described in connection with FIG. 4. Then, as indicated in FIG. 5, in S10, the OSS 30 sends an indication to the VNF orchestrator 50 that a load level in the present communication network is exceeded, for example due to a high traffic load or the like. This information in S10 can be seen as a trigger for the VNF orchestrator 50 to conduct an adjustment of amount and type of VNFs being instantiated in the virtualization infrastructure for a usage in the communication network managed by the OSS 30.

Furthermore, in S20, the OSS 30 sends control information containing traffic pattern information or traffic mix information of communications conducted in the communication network, such as a periodic traffic profile or the like, to the VNF orchestrator 50. It is to be noted that also the signaling in S10 can be regarded as part of the control information.

In addition to the control information received in S20, the VNF orchestrator 50 requests also control information from the virtualization infrastructure 60, e.g. via the VNF infrastructure manager 55, in order to learn the available hardware capability or resources which can be used by the VNF orchestrator 50 for the instantiation of at least one VNF. In S40, the VNF orchestrator 50 receives a corresponding response. For example, the response in S40 indicates, as parameters, available resources or utilized resources (e.g. memory space, processing cores, etc.) in the virtualization infrastructure, a utilisation level of different resources in the virtualization infrastructure used by a VNF (e.g. inside a processor running a VM of the VNF), etc. Alternatively or additionally, also thresholds or limits to be considered for a virtualization or instantiation process can be provided (e.g. maximum amount of memory space or processing cores allowed to be used for one instantiation, etc.).

In S50, after having acquired the control information from the different managing elements or functions (i.e. the OSS 30 and the VNF infrastructure manager 55, for example), the VNF orchestrator 50 conducts a processing for selecting at least one suitable VNF for usage in the communication network. The selection is based, for example, on a comparison of parameters derived from the control information (i.e. traffic pattern, HW resources) and corresponding parameters indicated in the data sets, which are provided e.g. in the VNF description types. That is, it is determined which VNF described in the data sets fits best to the observed traffic mix, wherein also available resources in the virtualization infrastructure may play a role for the selection process. In other words, a suitable VM flavour as indicated in the data sets is then selected based on the acquired traffic and HW information.

According to further examples of embodiments, the orchestrator has monitored in the past a network behaviour and/or is continuously monitoring the network behaviour. Based on this monitoring, the orchestrator is able to predict what type of VNF is to be instantiated, for example at a certain point in time. For example, when the network behaviour shows at a certain daytime an increased demand for UP traffic, the VNFs being instantiated or to be instantiated can be selected and/or configured so as to satisfy this requirement.

According to further examples of embodiments, in the selection processing, a traffic pattern to be observed may be represented by a ratio between normalized CP transactions per UP throughput. For a range of such ratios one or more of the VNFs as indicated in the data sets (see also table 1) with a corresponding SW image can be found a optimal or best fitting and hence selected to be used in the further processing.

Finally, in S60, based on the selection, the VNF orchestrator 50 conducts an instantiation process, i.e. takes the necessary actions to adjust the VNF amount and type of instantiations, by instructing the VNF infrastructure manager 55 to set up the selected VNF in the virtualization infrastructure.

It is to be noted that according to examples of embodiments, the selection of the appropriate VM flavour depends on the available variations, i.e. how many different data sets are prepared from which the VNF can be selected. Furthermore, also an operator specific setup can be considered in the selection processing. For example, the operator may define limits or thresholds, like a number of VNFs allowed to be instantiated or an amount of resources allowed to be used, which are to be considered in the selection process.

It is to be noted that even though the VNF orchestrator 50 is described to conduct measures as illustrated in FIG. 5, also another element or function can be implemented for conducting this processing. For example, any suitable management system can be employed in order to adjust the amount and type of VNFs in order to follow a requirement in the communication network.

Figure 6:
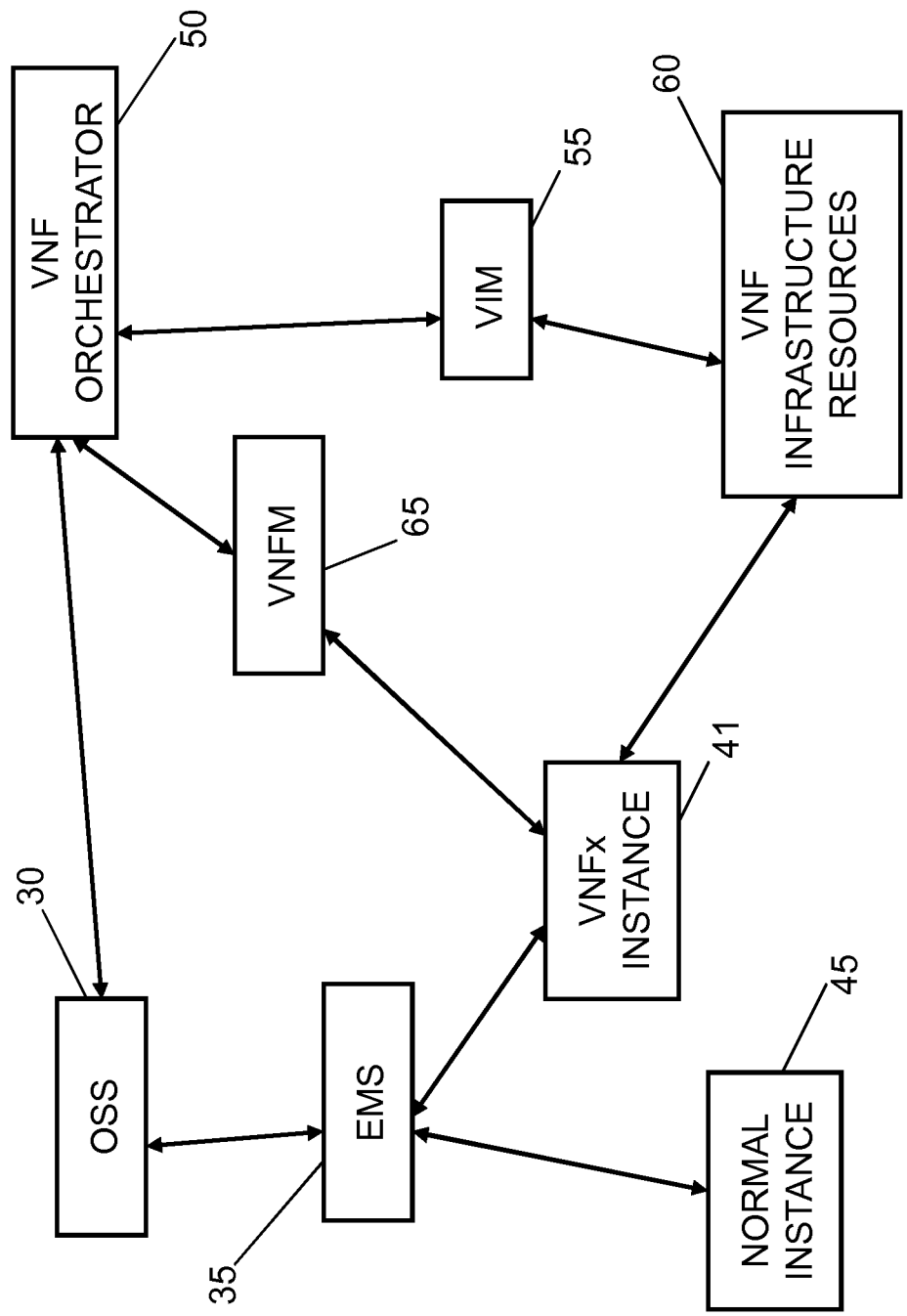
FIG. 6 shows a diagram illustrating a processing conducted in a communication network according to some examples of embodiments.

FIG. 6 shows a diagram illustrating the processing conducted in a communication network environment according to some examples of embodiments. It is to be noted that FIG. 6 shows an example diagram illustrating a configuration of a communication network where some examples of embodiments are implementable, wherein only those devices, network elements, functions, applications and/or parts are indicated which are useful for understanding principles underlying the examples and embodiments. As also known by those skilled in the art, there may be several other network elements, functions, applications or devices involved in a suitable network structure which are omitted here for the sake of simplicity.

In FIG. 6, a network structure is illustrated which is for example based on 3GPP and ETSI ISG NFV (European Telecommunications Standards Institute Industry Specification Group Network Function Virtualization) specifications. It is to be noted that the general functions of the elements and functions described in connection with FIG. 6 as well as of reference points/interfaces between the elements are known to those skilled in the art so that a detailed description thereof is omitted here for the sake of simplicity. Furthermore, as also known to persons skilled in the art, the number of elements, functions and applications indicated in FIG. 6 may vary, i.e. there may be implemented or instantiated more corresponding elements, functions and application than those shown in FIG. 6.

According to FIG. 6, on the side of the communication network (e.g. a 3GPP based cellular communication network), the OSS is connected with a EMS 35 which provides, for example, managing functions for one or more types of network elements. In the following, it is assumed that the EMS 35 is responsible for the management of GW (e.g. SGW, PGW) elements in the communication network. For this purpose, the EMS 35 is linked to corresponding network elements or functions, for example a normal "real" instance of a GW 45 and a VNF instance 41. It is to be noted that the number of instances to be considered is not limited to that shown in FIG. 6 and may vary. From the linked instances 41, 45, the EMS 35 can monitor the traffic situation and report corresponding indications, such as KPIs to the OSS 30 (for example, a CP and UP traffic or load in the GWs).

On the side of the virtualization infrastructure, VNF infrastructure resources 60 (such as for example memory space, processing cores etc. in a DC) are managed by a VIM 55 and provide resources for the instantiated VNF 41. The VIM 55 is linked to the VNF orchestrator 50 and sends, for example, indications such as KPIs for reporting on a load situation in the virtualization infrastructure, e.g. the load for cores in a processor, etc.

The VNF orchestrator 50 is in turn connected to a VNFM 65 which manages the VNFs (such as for example the VNF 41). For example, the VNF orchestrator 50 instructs the VNFM 65 to instantiate a (new) VNF or de-instantiate an existing VNF. In this context, also an indication regarding resources to be used for an instantiation (e.g. number of cores etc.) in the virtualization infrastructure is provided to the VNFM 65. Based on this information/instruction, the VNFM 65 manages the VNFs (e.g. VNF instance 41).

That is, when for example an overall traffic mix is used as input for selecting in the VNF orchestrator 50 a special type of VNF to be instantiated, as described above, the VNF orchestrator 50 (or VNF manager) acquires information about the resource usage in the virtualization infrastructure 60 (e.g. the DC) and provides a control loop for adjusting or adapting the VNF type to a resource requirement. The necessary information can be collected e.g. from the GW EMS 35 via the OSS 30, i.e. by collecting corresponding KPIs (describing a communication situation in the communication network, e.g. the number of transactions (related to the CP traffic) and a throughput in the GW (related to the UP traffic)). Furthermore, the VIM 55 can collect information about the resource situation in the virtualization infrastructure (e.g. a load of different cores of the processors indicating a balanced or unbalanced core usage), and/or information about the hardware capabilities of the DC. This information is used by the VNF orchestrator 50 (or the VNFM 65) to match with templates available for the VNF images.

Alternatively or additionally, the orchestrator 50 is configured to monitor the network behaviour over the time, such as a history of a communication traffic situation in the communication network, and use the experience made in the monitoring to predict a requirement for a specific VNF for example at a specific point of time. Then this prediction result can be used by the VNF orchestrator 50 to instantiate in the virtualization infrastructure the then required VNF for a usage in the communication network.

While in the above described example an overall traffic mix is used as input for selecting in the VNF orchestrator 50 a special type of VNF, it is also possible, according to further examples, that different VNF types are instantiated in parallel, wherein users are assigned to the VNF according to a subscription type or other characteristics. That is, for example, different VNF types are instantiated in parallel to cope with different traffic requirements, e.g. from different terminals/UEs like sensors and smart phones.

For example, the differentiation between VNFs being instantiated is based on a relation between CP and UP. That is, settings of the VNFs are based on a prediction of the relation between CP and UP for specific user types (e.g. for MTC devices).

According to one possible example, the VNF orchestrator 50 starts with an instantiation of different types of GWs according to an observed traffic type mix in the past. For example, in case the observed traffic mix concerns a utilization of GWs for internet traffic usage, the instantiated VNFs includes also those usable as Internet GWs, wherein e.g. the number of cores to be used for UP is high. In case the observed traffic mix concerns (also) a utilization of GWs for voice traffic usage, the instantiated VNFs includes those usable as voice GWs, wherein e.g. the number of cores to be used for CP is higher compared to the Internet GW case. Moreover, in case the observed traffic mix concerns (also) a utilization of GWs for MTC related traffic usage, the instantiated VNFs includes those usable as MTC GWs, wherein e.g. the number of cores to be used for CP is high.

During the process of GW selection in an attach or register process of a user equipment, according to the service being requested or an APN being used in the attach process, the correct (i.e. suitable) GW type is selected in the communication network, including the instantiated VNFs. According to a possible increase of decrease of the traffic amount per traffic type, the VNF can then be scaled independently per GW type.

It is to be noted that the above described methods, i.e. the usage of the overall traffic mix as input for selecting a specific type of VNF to be instantiated and the parallel instantiation of plural VNFs can be implemented and used in parallel.

According to further examples of embodiments, it is possible that the above described automation algorithms have different activity levels, e.g. depending on a discrepancy between resource utilization. That is, the VNF orchestrator 50 may be configured to act according to the automation algorithm only when a new instance is to be added e.g. for capacity increase, i.e. for example during a GW VM scaling out, in order to select a new VNF type/SW version that reflects the currently observed load situation (e.g. the average CP/UP load). Alternatively, the VNF orchestrator 50 may be configured to act according to the automation algorithm by removing a running VNF and replace it by new type of VNF, in order to reflect the currently observed load situation, for example.

By means of the above described control procedure for adjusting the VNF, for example a GW type, to the present traffic situation, it is possible to provide a VNF/VM mix which ensures an optimal resource utilization wherein it is not required to introduce a de-composition of communication properties into separated VNFs and VMs, such as CP and UP of a GW.

Now, examples of embodiments implementing the processing described in connection with e.g. FIGS. 4 to 6 are described in further detail with regard to FIG. 7.

Figure 7:
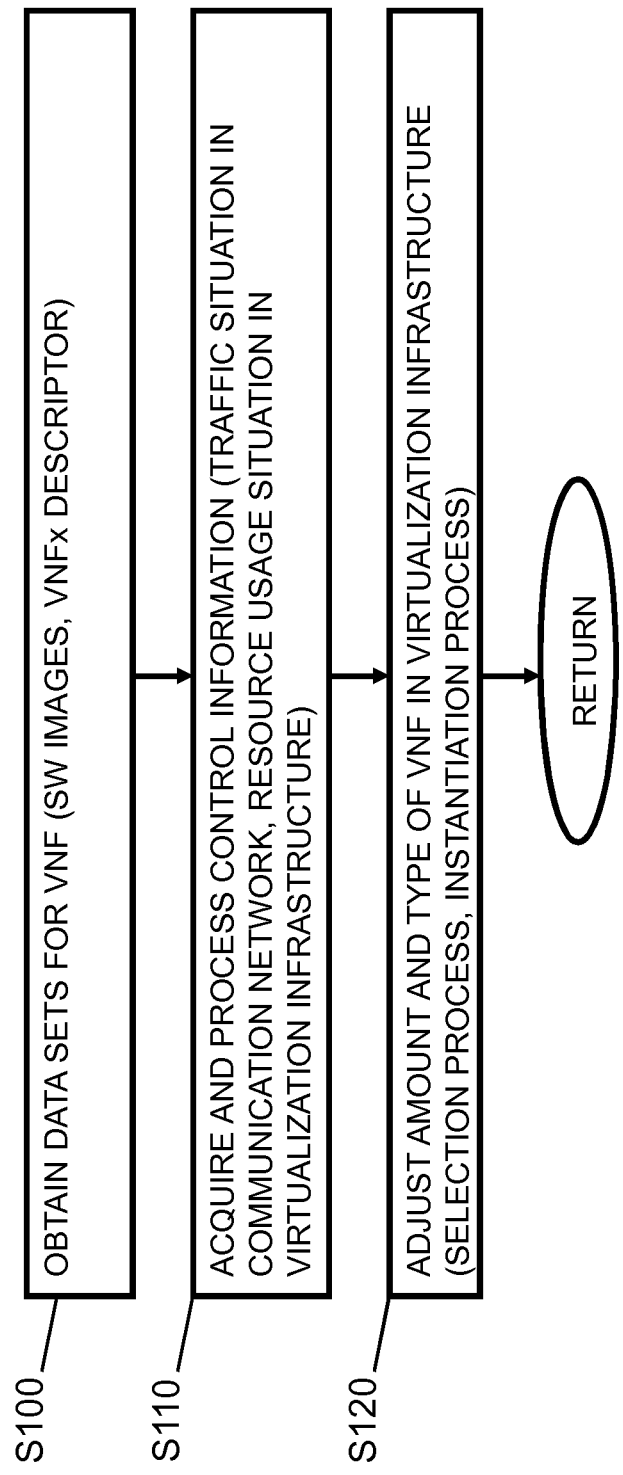
FIG. 7 shows a flow chart of a processing conducted in a communication network control element or function according to some examples of embodiments.

FIG. 7 shows a flow chart of a processing conducted in a communication network control element or function according to some examples of embodiments. For example, the processing is executed by one of a communication network control element or communication network control function acting as an orchestrator for implementing or instantiating virtualized communication functions or applications, an VNF manager element or function of a communication network, or a communication network control element or communication network control function of a communication network using virtualized communication functions or applications. According to some examples of embodiments, the virtualized network function, communication function or application being instantiated is related to a communication network control function of the communication network (e.g. core network function, access network function, IMS network function, etc.), a M2M communication function, an application, a terminal function etc.

In S100, a plurality of data sets is obtained wherein each data set describes a specific virtualized network function. For example, each of the plurality of data sets includes a software image corresponding to the specific virtualized network function. Alternatively or additionally, each of the data sets includes information about capabilities of the specific virtualized network function for a usage in a communication network (e.g. SW image, VNF descriptor etc.), and an amount and type of resources to be allocated in the virtualization infrastructure (e.g. number of processing cores, storage amount etc.). According to some examples, the amount and type of resources to be allocated in a virtualization infrastructure are separable with regard to resources to be allocated in the virtualization infrastructure for a usage in a CP of a VNF in the communication network and for a usage in a UP of the same VNF in the communication network.

According to some examples of embodiments, the data sets are obtained in a software build phase for implementing an orchestrator element or function for virtualized network functions. Alternatively or additionally, data sets are obtained during an operation phase of the orchestrator element or function for virtualized network functions. For example, corresponding data sets can be obtained at any time before the orchestrator element or function for virtualized network functions executes an instantiation process for instantiating a virtualized network function, i.e. after the orchestrator element or function is implemented (e.g. in the form of an update).

In S110, control information related to a communication traffic situation in the communication network for which at least one virtualized network function is implementable and/or a resource usage situation in the virtualization infrastructure in which at least one virtualized network function can be instantiated are acquired and processed. For example, the control information includes information about a traffic pattern or traffic mix of communications conducted in the communication network, an indication that a load level in the communication network exceeds a threshold (for example as a trigger for the adjustment process), information about processing resources, storing resources, and data transmission resources (interfaces, I/O bandwidth etc.) of the virtualization infrastructure available for an instantiation of at least one virtualized network function.

According to some examples of embodiments, the processing of the control information includes a comparison of parameters derived from the control information (actually required properties for communication network, which resources are available in the virtualization infrastructure) with parameters derived from the plurality of data sets (e.g. type of VNF to be instantiated, required resources for specific type of VNF in virtualization infrastructure etc.). Based on this comparison, a specific data set of the plurality of data sets is selected whose parameters matches (best) with the parameters derived from the control information.

In S120, an adjustment of an amount and type of at least one virtualized network function instantiated in the virtualization infrastructure for a usage in the communication network is made. According to examples of embodiments, this is executed by, based on the processed control information, selecting at least one virtualized network function from the obtained data sets, and by instantiating the selected at least one virtualized network function in the virtualization infrastructure. In an example embodiment, the selecting of the at least one virtualized network function considers variations in the plurality of data sets (e.g. selects one of the data sets which matches best, based on e.g. certain criteria and weighting factors) and an operator specific setup (e.g. considering thresholds of a maximum number of resources in the virtualization infrastructure under certain conditions, etc.).

According to some examples of embodiments, a control loop is implemented which is based on the processed control information. The control loop allows a permanent and repeated adjustment of the amount and type of at least one virtualized network function instantiated in the virtualization infrastructure for usage in the communication network. Alternatively or additionally, based on a monitored history of the communication traffic situation in the communication network, a requirement for a specific virtualized network function is predicted, wherein the adjustment of the amount and type of at least one virtualized network function instantiated in the virtualization infrastructure for usage in the communication network is based on the prediction.

Furthermore, according to some examples of embodiments, a plurality of different virtualized network functions is instantiated in parallel based on the data sets (for example based on an observed typical traffic mix pattern). User communications can then be assigned to a respective one of the different virtualized network functions according to at least one of a subscription type of the user communication, a service type for the user communication, and an access point type of the user communication. A further adjustment of the amount and type of virtualized network functions can be further conducted, e.g. by using a control loop as described above.

Moreover, according to some examples of embodiments, an activity level for adjusting the amount and type of at least one virtualized network function instantiated in the virtualization infrastructure for usage in the communication network is set in accordance with a resource usage state in the virtualization infrastructure. For example, the activity level is an activity level where the adjustment of the amount and type of at least one virtualized network function is conducted only in a case of scaling out for adding a new virtualized network function. Alternatively, the activity level is an activity level where the adjustment of the amount and type of at least one virtualized network function is conducted for removing a virtualized network function by replacing it with a new virtualized network function.

Figure 8:
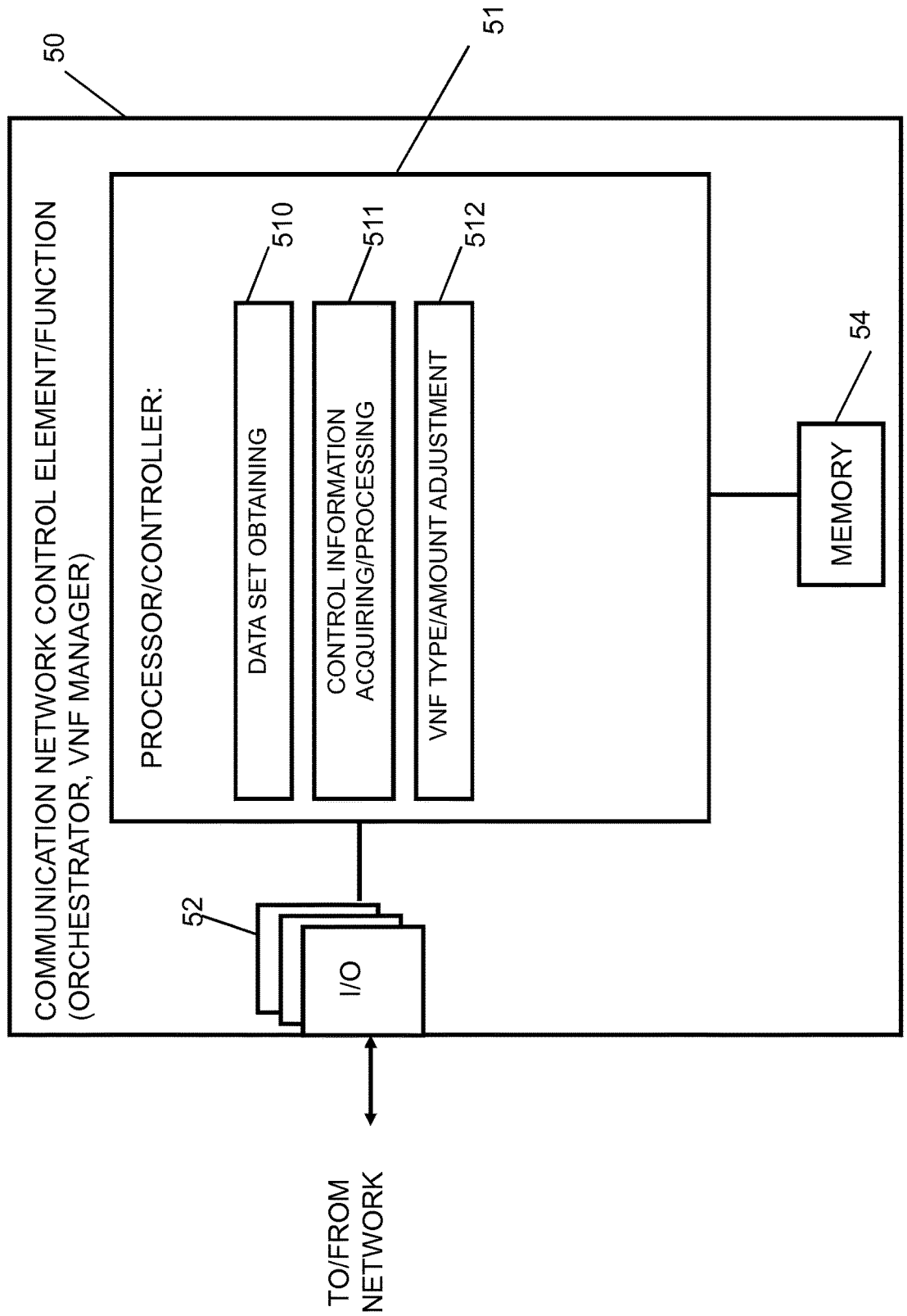
FIG. 8 shows a diagram of a communication network control element or function according to some examples of embodiments.

FIG. 8 shows a diagram of a communication network control element or function acting as an instantiation element or function for instantiating and adjusting virtualized network functions according to some examples of embodiments, which is configured to implement the control procedure as described in connection with some of the examples of embodiments. It is to be noted that the communication network control element or function, like the orchestrator 50, which is shown in FIG. 8, may include further elements or functions besides those described herein below. Furthermore, even though reference is made to a communication network control element or function, the element or function may be also another device or function having a similar task, such as a chipset, a chip, a module, an application etc., which can also be part of a communication network control element or function or attached as a separate element or function to a communication network control element or function, or the like. It should be understood that each block and any combination thereof may be implemented by various means or their combinations, such as hardware, software, firmware, one or more processors and/or circuitry.

The communication network control element or function shown in FIG. 8 may include a processing circuitry, a processing function, a control unit or a processor 51, such as a CPU or the like, which is suitable for executing instructions given by programs or the like related to the control procedure. The processor 51 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 52 denotes transceiver or input/output (I/O) units or functions (interfaces) connected to the processor or processing function 51. The I/O units 52 may be used for communicating with one or more network elements, such as OSS elements, managing elements or functions, core network elements or functions, databases/datacenters and the like. The I/O units 52 may be a combined unit including communication equipment towards several network elements, or may include a distributed structure with a plurality of different interfaces for different network elements. Reference sign 54 denotes a memory usable, for example, for storing data and programs to be executed by the processor or processing function 51 and/or as a working storage of the processor or processing function 51.

The processor or processing function 51 is configured to execute processing related to the above described control procedure. In particular, the processor or processing circuitry or function 51 includes a sub-portion 510 as a processing portion which is usable for obtaining data sets. The portion 510 may be configured to perform processing according to S100 of FIG. 7. Furthermore, the processor or processing circuitry or function 51 includes a sub-portion 511 usable as a portion for acquiring and processing control information. The portion 511 may be configured to perform processing according to S110 of FIG. 7. Furthermore, the processor or processing circuitry or function 51 includes a sub-portion 512 usable as a portion adjusting amount and type of VNF. The portion 512 may be configured to perform a processing according to S120 of FIG. 7.

According to an example of embodiments, there is provided an apparatus including means for obtaining a plurality of data sets each describing a specific virtualized network function, means for acquiring and processing control information related to at least one of a communication traffic situation in a communication network for which at least one virtualized network function is implementable and a resource usage situation in a virtualization infrastructure in which at least one virtualized network function can be instantiated, and means for adjusting an amount and type of at least one virtualized network function instantiated in the virtualization infrastructure for usage in the communication network by, based on the processed control information, selecting at least one virtualized network function from the obtained data sets, and instantiating the selected at least one virtualized network function.

According to an aspect A, there is provided an apparatus including at least one processing circuitry, and at least one memory for storing instructions to be executed by the processing circuitry, wherein the at least one memory and the instructions are configured to, with the at least one processing circuitry, cause the apparatus at least:

to obtain a plurality of data sets each describing a specific virtualized network function, acquire and process control information related to at least one of a communication traffic situation in a communication network for which at least one virtualized network function is implementable and a resource usage situation in a virtualization infrastructure in which at least one virtualized network function can be instantiated, and adjust an amount and type of at least one virtualized network function instantiated in the virtualization infrastructure for usage in the communication network by based on the processed control information, selecting at least one virtualized network function from the obtained data sets, and instantiating the selected at least one virtualized network function.

Furthermore, according to an aspect A1, in the apparatus according to aspect A, the data sets each include information about at least one of capabilities of the specific virtualized network function for a usage in the communication network, and an amount and type of resources to be allocated in the virtualization infrastructure.

Furthermore, according to an aspect A2, in the apparatus according to aspect A1, the amount and type of resources to be allocated in the virtualization infrastructure are separable with regard to resources to be allocated in the virtualization infrastructure for a usage in a control plane of a virtualized network in the communication network and for a usage in a user plane of the same virtualized network in the communication network.

Furthermore, according to an aspect A3, in the apparatus according to any of aspects A to A2, the at least one memory and the instructions are further configured to, with the at least one processing circuitry, cause the apparatus to obtain the plurality of data sets in at least one of a software build phase for implementing an orchestrator element or function for virtualized network functions, an operation phase of the orchestrator element or function for virtualized network functions, and at any time before the orchestrator element or function for virtualized network functions executes an instantiation process for instantiating a virtualized network function.

Furthermore, according to an aspect A4, in the apparatus according to any of aspects A to A3, the control information includes at least one of information about a traffic pattern or traffic mix of communications conducted in the communication network, an indication that a load level in the communication network exceeds a threshold, and information about at least one of processing resources, storing resources, and data transmission resources of the virtualization infrastructure available for an instantiation of at least one virtualized network function.

Furthermore, according to an aspect A5, in the apparatus according to any of aspects A to A4, the at least one memory and the instructions are further configured to, with the at least one processing circuitry, cause the apparatus, in the processing of the control information, to compare parameters derived from the control information with parameters derived from the plurality of data sets, and to determine a data set of the plurality of data sets whose parameters matches with the parameters derived from the control information.

Furthermore, according to an aspect A6, in the apparatus according to any of aspects A to A5, the at least one memory and the instructions are further configured to, with the at least one processing circuitry, cause the apparatus to consider, in the selecting of the at least one virtualized network function, variations in the plurality of data sets and an operator specific setup.

Furthermore, according to an aspect A7, in the apparatus according to any of aspects A to A6, the at least one memory and the instructions are further configured to, with the at least one processing circuitry, cause the apparatus to implement a control loop based on the processed control information for adjusting the amount and type of at least one virtualized network function instantiated in the virtualization infrastructure for usage in the communication network, and/or to predict, based on a monitored history of the communication traffic situation in the communication network, a requirement for a specific virtualized network function, wherein the adjustment of the amount and type of at least one virtualized network function instantiated in the virtualization infrastructure for usage in the communication network is based on the prediction.

Furthermore, according to an aspect A8, in the apparatus according to any of aspects A to A7, the at least one memory and the instructions are further configured to, with the at least one processing circuitry, cause the apparatus to instantiate in parallel a plurality of different virtualized network functions based on the data sets, wherein user communications are assigned to a respective one of the different virtualized network functions according to at least one of a subscription type of the user communication, a service type for the user communication, and an access point type of the user communication.

Furthermore, according to an aspect A9, in the apparatus according to any of aspects A to A8, the at least one memory and the instructions are further configured to, with the at least one processing circuitry, cause the apparatus to set an activity level for adjusting the amount and type of at least one virtualized network function instantiated in the virtualization infrastructure for usage in the communication network according to a resource usage state in the virtualization infrastructure, wherein the activity level is one of an activity level where the adjustment of the amount and type of at least one virtualized network function is conducted only in a case of scaling out for adding a new virtualized network function, and an activity level where the adjustment of the amount and type of at least one virtualized network function is conducted for removing a virtualized network function by replacing it with a new virtualized network function.

Furthermore, according to an aspect A10, the apparatus according to any of aspects A to A9 is implemented by one of a communication network control element or communication network control function acting as a orchestrator for instantiating virtualized network functions, and a communication network control element or communication network control function of acting as a manager for the virtualized network function wherein the at least one virtualized network function being instantiated is related to a communication network control function of the communication network.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines.

as examples for virtualized network functions or applications, besides network functions related to an access or core network of a communication element, also functions related to a machine equipment corresponding to an M2M architecture can be used.

a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C #, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

For example, while in the above described examples of embodiments a GW is used as an example for the virtualized network function being instantiated, the invention is not limited thereto. For example, other network entities such as, SGSN, GGSN, MME, SGW, PGW etc., or a RAN element like an eNB may be used as examples of a virtualized network function to which the described examples of embodiments are applicable. As indicated above, examples of embodiments of the invention are also applicable for other network systems, such as an IMS based system, where elements like a P-CSCF, IBCF, BGCF, MGCF etc may be instantiated as virtualized network functions where examples of embodiments of the invention are applicable.

The invention claimed is:
1. A method including:
receiving at least one indication that a load level in a communication network is exceeded;
obtaining a plurality of data sets, each data set describing, for a specific virtualized network function, at least one software image, at least one capability of the specific virtualized network function for a usage in the communication network, and an amount and type of at least one resource to be allocated in a virtualization infrastructure;

acquiring and processing control information related to at least one of a communication traffic situation in the communication network for which at least one virtualized network function is implementable and a processor core load situation in the virtualization infrastructure in which at least one virtualized network function can be instantiated, the control information comprising information about a traffic pattern or traffic mix of communications conducted in the communication network; and adjusting an amount and type of at least one virtualized network function instantiated in the virtualization infrastructure for usage in the communication network by:
based on the processed control information, selecting at least one virtualized network function from the obtained data sets; and
instantiating the selected at least one virtualized network function.

2. The method according to claim 1, wherein the amount and type of resources to be allocated in the virtualization infrastructure are separable with regard to resources to be allocated in the virtualization infrastructure for a usage in a control plane of a virtualized network function in the communication network and for a usage in a user plane of the same virtualized network function in the communication network.

3. The method according to claim 1, wherein the plurality of data sets is obtained in at least one of a software build phase for implementing an orchestrator element or function for virtualized network functions, an operation phase of the orchestrator element or function for virtualized network functions, and at any time before the orchestrator element or function for virtualized network functions executes an instantiation process for instantiating a virtualized network function.

4. The method according to claim 1, wherein the control information includes at least one of:
information about at least one of processing resources, storing resources, and data transmission resources of the virtualization infrastructure available for an instantiation of at least one virtualized network function.

5. The method according to claim 1, wherein the processing of the control information includes
comparing of parameters derived from the control information with parameters derived from the plurality of data sets, and
determining a data set of the plurality of data sets whose parameters matches with the parameters derived from the control information.

6. The method according to claim 1, wherein the selecting of the at least one virtualized network function considers variations in the plurality of data sets and an operator specific setup.

7. The method according to claim 1, further including at least one of
implementing a control loop based on the processed control information for adjusting the amount and type of at least one virtualized network function instantiated in the virtualization infrastructure for usage in the communication network, and
predicting, based on a monitored history of the communication traffic situation in the communication network, a requirement for a specific virtualized network function, wherein the adjustment of the amount and type of at least one virtualized network function instantiated in the virtualization infrastructure for usage in the communication network is based on the prediction.

8. The method according to claim 1, further including
instantiating in parallel a plurality of different virtualized network functions based on the data sets, wherein user communications are assigned to a respective one of the different virtualized network functions according to at least one of a subscription type of the user communication, a service type for the user communication, and an access point type of the user communication.

9. The method according to claim 1, further including
setting an activity level for conducting the adjustment of the amount and type of at least one virtualized network function instantiated in the virtualization infrastructure for usage in the communication network according to a resource usage state in the virtualization infrastructure, wherein the activity level is one of
an activity level where the adjustment of the amount and type of at least one virtualized network function is conducted only in a case of scaling out for adding a new virtualized network function, and
an activity level where the adjustment of the amount and type of at least one virtualized network function is conducted for removing a virtualized network function by replacing it with a new virtualized network function.

10. The method according to claim 1, wherein the method is executed by one of
a communication network control element or communication network control function acting as a orchestrator for instantiating virtualized network functions, and
a communication network control element or communication network control function of acting as a manager for the virtualized network function
wherein the at least one virtualized network function being instantiated is related to a communication network control function of the communication network.

11. An apparatus including:
at least one physical processor configured to:
receive at least one indication that a load level in a communication network is exceeded;
obtain a plurality of data sets, each data set describing, for a specific virtualized network function, at least one software image, at least one capability of the specific virtualized network function for a usage in the communication network, and an amount and type of at least one resource to be allocated in a virtualization infrastructure;
acquire and process control information related to at least one of a communication traffic situation in the communication network for which at least one virtualized network function is implementable and a processor core load situation in the virtualization infrastructure in which at least one virtualized network function can be instantiated, the control information comprising at least one of information about a traffic pattern or traffic mix of control and user plane traffic conducted in the communication network; and
adjust an amount and type of at least one virtualized network function instantiated in the virtualization infrastructure for usage in the communication network by:
based on the processed control information, selecting at least one virtualized network function from the obtained data sets, and
instantiating the selected at least one virtualized network function.

12. A computer program product embodied on a non-transitory computer-readable medium, said computer-readable medium comprising software code portions for performing the steps of claim 1, wherein said software code portions are run on a computer.

13. The computer program product according to claim 12, wherein
the computer program product is directly loadable into the internal memory of the computer and/or transmittable via a network by means of at least one of upload, download and push procedures.

* * * * *